(12) United States Patent
Dennis

(10) Patent No.: US 11,679,714 B1
(45) Date of Patent: *Jun. 20, 2023

(54) RESTRAINT WITH INDICATOR AREA

(71) Applicant: APPLE INC., Cupertino, CA (US)

(72) Inventor: Nathaniel J. Dennis, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,044

(22) Filed: Feb. 4, 2022

Related U.S. Application Data

(63) Continuation of application No. 16/904,603, filed on Jun. 18, 2020, now Pat. No. 11,273,756.

(60) Provisional application No. 62/904,227, filed on Sep. 23, 2019.

(51) Int. Cl.
| | |
|---|---|
| *B60Q 3/242* | (2017.01) |
| *B60R 22/18* | (2006.01) |
| *A44B 11/25* | (2006.01) |
| *B60Q 3/80* | (2017.01) |
| *B60R 22/48* | (2006.01) |
| *F21V 11/14* | (2006.01) |
| *B60Q 3/60* | (2017.01) |
| *F21W 111/00* | (2006.01) |
| *F21Y 115/10* | (2016.01) |

(52) U.S. Cl.
CPC .......... *B60Q 3/242* (2017.02); *A44B 11/2511* (2013.01); *A44B 11/2565* (2013.01); *B60Q 3/60* (2017.02); *B60Q 3/80* (2017.02); *B60R 22/18* (2013.01); *B60R 22/48* (2013.01); *F21V 11/14* (2013.01); *B60R 2022/4866* (2013.01); *F21W 2111/00* (2013.01); *F21Y 2115/10* (2016.08)

(58) Field of Classification Search
CPC .. B60Q 3/242; B60Q 3/60; B60Q 3/80; B60R 22/18; B60R 22/48; B60R 2022/4866; A45B 11/2511; A45B 11/2565; F21V 11/14; F21W 2111/00; F21Y 2115/10
See application file for complete search history.

(56) References Cited

U.S. PATENT DOCUMENTS

| | | | |
|---|---|---|---|
| 7,880,131 B2 | 2/2011 | Andre et al. | |
| 8,450,640 B2 | 5/2013 | Hardy et al. | |
| 9,481,318 B2 | 11/2016 | Schmotzer et al. | |
| 2011/0222298 A1* | 9/2011 | Hardy | B29C 66/472 362/362 |

(Continued)

FOREIGN PATENT DOCUMENTS

EP  3251540 A1  12/2017

*Primary Examiner* — Thomas M Sember
(74) *Attorney, Agent, or Firm* — Young Basile Hanlon & MacFarlane, P.C.

(57) ABSTRACT

A restraint includes a belt, a connecting structure that is connected to the belt, a buckle housing that includes a connector opening for insertion of the connecting structure, a latch assembly that is configured to retain the connecting structure in the connector opening, and a release button that is connected to the buckle housing and is configured to cause the latch assembly to release the connecting structure when the release button is operated. A first indicator area is located on the buckle portion adjacent to the connector opening. A second indicator area is located on the release button. A third indicator area is located on the release button and is surrounded by the second indicator area.

21 Claims, 5 Drawing Sheets

(56) References Cited

U.S. PATENT DOCUMENTS

2015/0266417 A1  9/2015 Salter et al.
2016/0031367 A1  2/2016 Salter et al.

* cited by examiner

RESTRAINT WITH INDICATOR AREA

CROSS-REFERENCE TO RELATED APPLICATIONS

This application is a continuation of U.S. application Ser. No. 16/904,603, filed on Jun. 18, 2020, which claims the benefit of U.S. Provisional Application No. 62/904,227, filed on Sep. 23, 2019, the content of which is hereby incorporated by reference herein for all purposes.

TECHNICAL FIELD

The application relates generally to restraints.

BACKGROUND

One type of restraint is commonly referred to as a seat belt. Conventional seat belt designs are attached to a structure (e.g., body portion, seat frame, etc.) at two or more locations. One common design is a three-point seat belt that includes a buckle that is mounted to a structure on one side of a seat near the seat surface, and a belt assembly including a belt that is connected (e.g., by a retractor or a fixed connection) to a body pillar or seat structure near the seat occupant's shoulder height and also mounted to a structure on an opposite side of the seat surface relative to the buckle. A connecting structure, typically including a metal plate, is located on the belt and is insertable into the buckle, such that a first part of the belt extends across the seat occupant's lap and a second part of the belt extends across the seat occupant's torso. The buckle includes a latching mechanism that secures the connecting structure within the buckle. A release button is operable to disconnect the latching mechanism from the buckle when pressed.

SUMMARY

One aspect of the disclosure is a safety restraint for a vehicle. The safety restraint includes a belt, a connecting structure that is connected to the belt, a buckle housing that includes a connector opening for insertion of the connecting structure, a latch assembly that is configured to retain the connecting structure in the connector opening, and a release button that is connected to the buckle housing and is configured to cause the latch assembly to release the connecting structure when the release button is operated. A first indicator area is located on the buckle portion adjacent to the connector opening. The first indicator area includes a buckle surface of the buckle portion, first holes formed through the buckle surface of the buckle portion, and a first lighting device that is located in a first interior space that is behind the buckle surface. A second indicator area is located on the release button, the second indicator area includes a button surface of the release button, second holes formed through the button surface of the release button, and a second lighting device that is located in a second interior space that is behind the button surface. A third indicator area is located on the release button and surrounded by the second indicator area, the third indicator area including a button surface of the release button, third holes formed through the button surface of the release button, and a third lighting device that is located in a third interior space that is behind the button surface.

In some implementations, the first holes are arranged in an array on the buckle surface of the buckle housing, the second holes are arranged in an array on the button surface of the release button, and the third holes are arranged in an array on the button surface of the release button.

In some implementations, the first holes, the second holes, and the third holes are between thirty micrometers and one-hundred micrometers in diameter.

In some implementations, the first holes, the second holes, and the third holes have a consistent diameter.

In some implementations, the first holes, the second holes, and the third holes have a tapered diameter.

In some implementations, a translucent material is located in the first holes, the second holes, and the third holes.

Another aspect of the disclosure is a safety restraint for a vehicle. The safety restraint includes a belt portion, a buckle portion that is connectable to the belt portion, and a first indicator area. The first indicator area is located on the buckle portion. The first indicator area includes an opaque surface of the buckle portion, holes formed through the opaque surface of the buckle portion, and a lighting device that is located in an interior space that is behind the opaque surface. The lighting device may be activated and deactivated to define a first illumination state in which the first indicator area is illuminated by the lighting device and a second illumination state in which the first indicator area is not illuminated by the lighting device.

In some implementations, the holes are arranged in an array through the opaque surface. In some implementations, the holes are between thirty micrometers and one-hundred micrometers in diameter. In some implementations, the holes have a consistent diameter from the interior space to the opaque surface. In some implementations, the holes have a tapered diameter from a larger diameter adjacent to the interior space a smaller diameter adjacent to the opaque surface. In some implementations, a translucent material is located in the holes.

In some implementations, the lighting device includes light-emitting diodes. In some implementations, the lighting device includes a video display. In some implementations, the opaque surface is formed from aluminum.

In some implementations, the safety restraint also includes a controller for controlling activation and deactivation of the first lighting device.

Another aspect of the disclosure is a safety restraint for a vehicle. The safety restraint includes a belt, a connecting structure that is connected to the belt, a buckle housing that includes a connector opening for insertion of the connecting structure, a latch assembly that is configured to retain the connecting structure in the connector opening, and a release button. The release button is connected to the buckle housing and is configured to cause the latch assembly to release the connecting structure when the release button is operated. The release button includes a button surface, holes that are formed through the button surface and a lighting device that is located behind the button surface and is configured to emit light through the holes.

In some implementations, the lighting device is controllable to define a first illumination state for the release button and a second illumination state for the release button, wherein the lighting device is not activated in the first illumination state and the lighting device is activate in the second illumination state.

In some implementations, the button surface is formed from an opaque material. In some implementations, the opaque material is aluminum.

In some implementations, the holes are arranged in an array through the button surface. In some implementations, the holes are between thirty micrometers and one-hundred micrometers in diameter. In some implementations, a translucent material is located in the holes.

In some implementations, the lighting device includes light-emitting diodes. In some implementations, the lighting device includes a video display.

DETAILED DESCRIPTION

The description herein relates to a safety restraint that utilizes light emitted through an array of very small holes through an otherwise opaque surface to provide information to users regarding operation of the safety restraint. As one example, many seat belt buckles include red-colored release buttons to allow the user to easily discern the location and function of the button. In the safety restraints that are described herein, small holes are formed through opaque structures allow transmission of light. In particular, portions of the restraint use light that is emitted through the holes (either empty or filled with a translucent material), which are formed through an otherwise opaque portion of the safety restraint, to indicate the location and function of portions of the restraint. The size of the holes is sufficiently small such that they are not readily visible to the naked eye of a vehicle occupant on casual inspection. As an example, the release button on the buckle may be colored red when the indication of location and function is meaningful to the user when a user enters the vehicle and has not seat sat down in a seat and secured their safety restraint and may be uncolored (i.e., colored according to the nominal color of the opaque structure).

Figure 1:
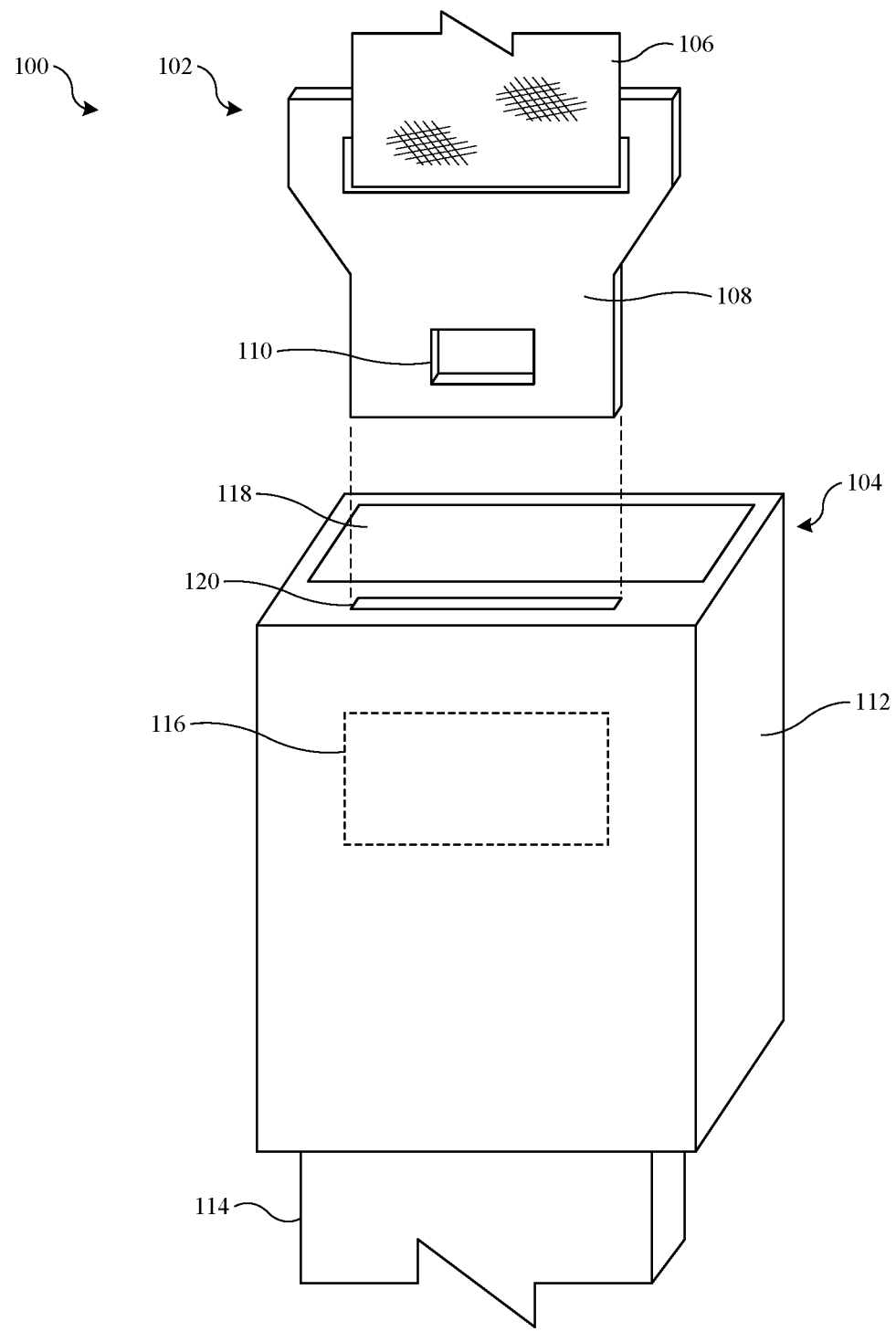
FIG. 1 is an illustration that shows a safety restraint that has a belt portion and a buckle portion.

FIG. 1 is an illustration that shows a safety restraint 100. The safety restraint 100 includes a belt portion 102 and a buckle portion 104. The belt portion 102 is releasably connectable to the buckle portion 104 to define a connected position and a disconnected position.

The belt portion 102 includes a belt 106 and a tongue plate 108. The belt 106 is a webbed belt that is intended to engage the body of a seat occupant in order to control motion of the seat occupant with respect to a seat of a vehicle. The belt 106 may be a webbed belt as is commonly used in conventional safety restraint designs. The tongue plate 108 is an example of a connecting structure that is configured to releasably connect the belt portion 102 to the buckle portion 104. In the illustrated example an opening 110 is formed through the tongue plate 108 for engagement with a releasable locking structure of the buckle portion 104. The tongue plate 108 is permanently connected to the belt 106 (e.g., by a fixed connection or sliding connection). The belt 106 is connected to the vehicle at both of its ends, either by direct connection to a body or frame of the vehicle, or by indirect connection to the body or frame of the vehicle by connection to another vehicle structure, such as a seat frame. The belt 106 may be connected relative to the vehicle at each end by a fixed connection or by a retractor.

The buckle portion 104 includes a buckle housing 112, a mounting structure 114, a latch assembly 116, and a release button 118. The buckle housing 112 is a structure that connects to and/or encloses other structures of the buckle portion 104. The mounting structure 114 connects the buckle housing 112 to the vehicle, either directly to the body or frame or indirectly through another structure.

The buckle housing 112 includes a slot 120, which is an example of a connector opening that is configured to receive a connecting structure, which in the illustrated implementation is the tongue plate 108 of the belt portion 102. The slot 120 is configured to receive the tongue plate 108 such that the tongue plate 108 may be inserted into the buckle housing 112 and extend into the buckle housing 112 such that that the belt portion 102 may be connected to the buckle portion 104 to define the connected position.

The latch assembly 116 is located inside the buckle housing 112 and is configured to retain the tongue plate 108 (or other connecting structure) in the slot 120 (or other connector opening). The latch assembly 116 is conventional and may be implemented according to a number of designs that are well-known in the safety restraint art. As an example, the latch assembly 116 may include a structure that is configured to extend into the opening 110 of the tongue plate 108 when the tongue plate 108 is inserted into the slot 120 of the buckle housing 112, such that engagement of a portion of the latch assembly 116 is the tongue plate 108 restrains removal of the tongue plate 108 from the slot 120 of the buckle housing 112. The release button 118 is a mechanical button that is connected to the buckle housing 112 and is operably connected to the latch assembly 116 to operate a release function of the latch assembly 116. The release button 118 can be depressed by the seat occupant to release cause the latch assembly 116 to disengage from the opening 110 of the tongue plate 108 to release the tongue plate 108 from the latch assembly 116 when the release button 118 is operated so that the tongue plate 108 can be removed from the slot 120 to allow the belt portion 102 to be moved from the connected position to the disconnected position relative to the buckle portion 104.

Figure 2:
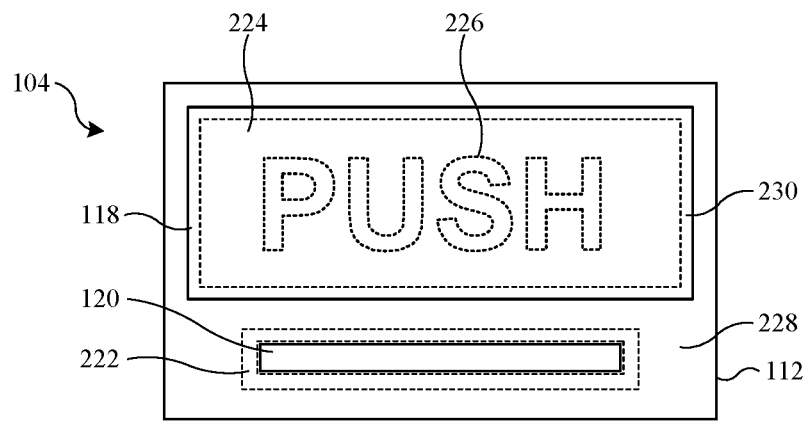
FIG. 2 an illustration that shows the buckle portion of the safety restraint in a first illumination state in which a first indicator area, a second indicator area, and a third indicator area are not illuminated.

FIG. 2 an illustration that shows the buckle portion 104 of the safety restraint 100 in a first illumination state. The buckle portion 104 includes a first indicator area 222, a second indicator area 224, and a third indicator area 226. The first indicator area 222, the second indicator area 224, and the third indicator area 226 are formed on exterior surfaces of the buckle portion 104. As will be explained herein, the first indicator area 222, the second indicator area 224, and the third indicator area 226 can be controlled such that they are either illuminated or not illuminated.

In the first illumination state (FIG. 2), the first indicator area 222 is not illuminated, the second indicator area 224 is not illuminated, and the third indicator area 226 is not illuminated. Thus, in the illustrated example, the first illumination state corresponds to no illumination using the first indicator area 222, the second indicator area 224, and the third indicator area 226. As an example, the safety restraint 100 may be controlled to activate the first illumination state when the vehicle that the safety restraint 100 is installed in is not powered on. As another example, the safety restraint 100 may be controlled to activate the first illumination state when the vehicle that the safety restraint 100 is installed in is powered on, the seat associated with the safety restraint 100 is occupied, the safety restraint 100 is (e.g., the belt portion 102 and the buckle portion 104 are in the disconnected position), and the vehicle is in motion.

As will be explained herein, indicator areas, including the first indicator area 222, the second indicator area 224, and the third indicator area 226, are formed by defining small holes through otherwise opaque structures, such as portions of the buckle housing 112 and the release button 118. As examples, opaque structures such as the portions of the buckle housing 112 and the release button 118 may be formed from materials such as metal (e.g., aluminum) or opaque plastic. Lighting devices inside the opaque structures are configured to emit light that is visible through the holes that are formed in the opaque structures. When the indicator areas are not illuminated, the opaque structure, on casual observation by the naked eye, appears to be uninterrupted due to the small size of the holes, and the presence of an illuminable area is not readily detected. Although three indicator areas are shown in the illustrated examples, additional indicator areas could be formed in the same manner, with no limitation on the number of indicator areas included.

In the illustrated example, the first indicator area 222 is formed on a housing surface 228 which is an exterior surface that is located on the buckle housing 112. The first indicator area 222 is located such that it is on a visible portion of the outside of the buckle housing 112 and may be viewed by occupants of the vehicle that the safety restraint 100 is installed in. The first indicator area 222 is located adjacent to the slot 120. In the illustrated example, the first indicator area 222 extends around the slot 120 continuously and forms a closed shape around the slot 120. The first indicator area 222 is intended to show the user the location of the slot 120. This information is not relevant to the user at all times. For example, information showing the location of the slot 120 may be most useful during the time period after the user first enters the vehicle, so that the user is reminded to buckle the safety restraint 100 and can quickly identify the location of the slot 120 and correctly position the tongue plate 108 (or other connecting structure) of the belt portion 102 with respect to the slot 120. This information may subsequently become less important, such as during a time period that the belt portion 102 is connected to the buckle portion 104, e.g., by insertion of the tongue plate 108 into the slot 120 and engagement of the latch assembly 116 of the buckle portion 104 with the opening 110 that is formed through the tongue plate 108.

In the illustrated example, the second indicator area 224 and the third indicator area 226 are formed on a button surface 230, which is an exterior surface that is located on the release button 118. The button surface 230 includes all of or a majority of the portion of the release button 118 that is visible when the release button 118 is not depressed. The second indicator area 224 and the third indicator area 226 are located on the release button 118 such that the second indicator area 224 and the third indicator area on a visible portion of the outside of the release button 118 and may be viewed by occupants of the vehicle that the safety restraint 100 is installed in.

The second indicator area 224 occupies most of the area of the button surface 230, and may extend adjacent to the peripheral edges of the release button 118 that are adjacent to portions of the buckle housing 112. The third indicator area 226 is bounded by and is completely surrounded (e.g., bordered on all sides) by the second indicator area 224. In the illustrated example, the third indicator area is utilized to display a text message, such as the word "push."

In the illustrated example, the second indicator area 224 and the third indicator area 226 may be illuminated at the same time with the same color and intensity of light to define an uninterrupted illuminated area on the button surface 230 of the release button 118. The function of the uninterrupted illuminated area is to illuminate the end surface of the release button to indicate the presence and location of the release button 118 to occupants of the vehicle that the safety restraint is installed in. The third indicator area 226, illuminated by itself or with contrasting color and/or intensity relative to the second indicator area 224, functions to display a message to the user, which may be a text message (as in the illustrated example) or graphical message.

Figure 3:
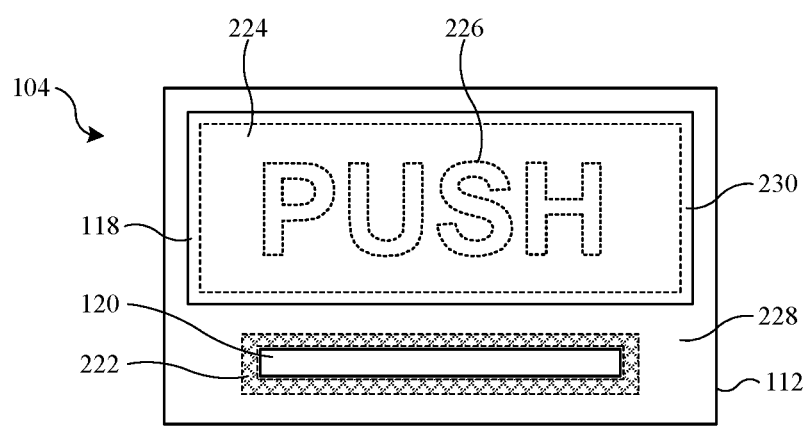
FIG. 3 an illustration that shows the buckle portion of the safety restraint in a second illumination state in which a first indicator area is illuminated, and a second indicator area and a third indicator area are not illuminated.

FIG. 3 an illustration that shows the buckle portion 104 of the safety restraint 100 in a second illumination state. In the second illumination state (FIG. 3), the first indicator area 222 is illuminated, the second indicator area 224 is not illuminated, and the third indicator area 226 is not illuminated. As an example, the safety restraint 100 may be controlled to activate the first illumination state when the vehicle that the safety restraint 100 is installed in is powered on, the vehicle is stationary, and the seat associated with the safety restraint 100 is not occupied. In the illustrated example, the second illumination state illuminates the area near or around the slot 120 is (e.g., colored white) to indicate the location of the slot 120 and facilitate alignment.

Figure 4:
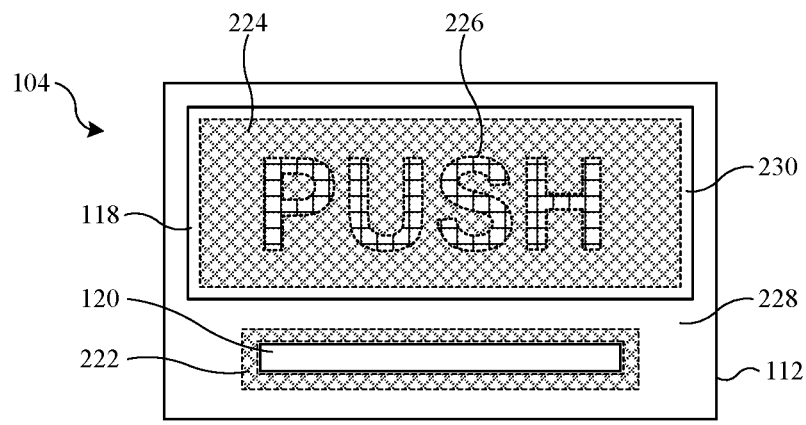
FIG. 4 an illustration that shows the buckle portion of the safety restraint in a third illumination state in which a first indicator area, a second indicator area and a third indicator area are illuminated.

FIG. 4 an illustration that shows the buckle portion 104 of the safety restraint 100 in a third illumination state. In the third illumination state (FIG. 4), the first indicator area 222 is illuminated, the second indicator area 224 is illuminated, and the third indicator area 226 is illuminated. As an example, the safety restraint 100 may be controlled to activate the third illumination state when the vehicle that the safety restraint 100 is installed in is powered on, the vehicle is stationary, the seat associated with the safety restraint 100 is occupied, and the safety restraint 100 is not buckled (e.g., the belt portion 102 and the buckle portion 104 are in the disconnected position). In the illustrated example, the third illumination state illuminates the release button 118 (e.g., colored red) in order to indicate to the seat occupant that the safety restraint 100 must be buckled, and the area near or around the slot 120 is illuminated (e.g., colored white) to indicate the location of the slot 120 and facilitate alignment.

Figure 5:
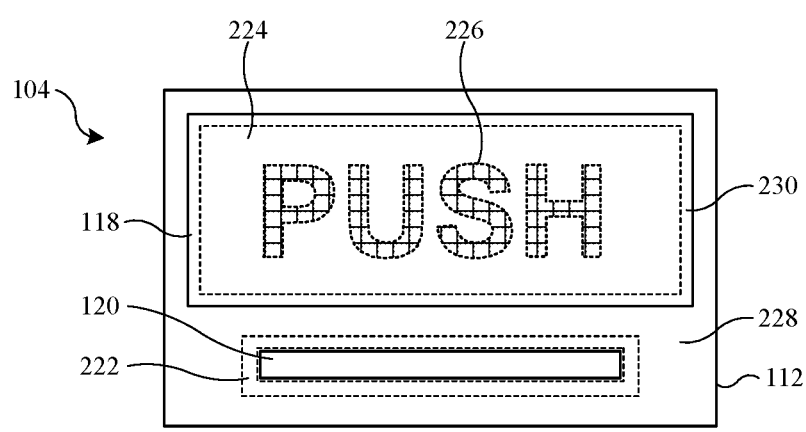
FIG. 5 an illustration that shows the buckle portion of the safety restraint in a fourth illumination state in which a first indicator area and a second indicator area are not illuminated, and a third indicator area is illuminated.

FIG. 5 an illustration that shows the buckle portion 104 of the safety restraint 100 in a fourth illumination state in which a first indicator area and a second indicator area are not illuminated, and a third indicator area is illuminated. As an example, the safety restraint 100 may be controlled to activate the fourth illumination state when the vehicle that the safety restraint 100 is installed in is powered on, the vehicle is stationary, the seat associated with the safety restraint 100 is occupied, and the safety restraint 100 is buckled (e.g., the belt portion 102 and the buckle portion 104 are in the connected position). The fourth illumination state displays a text message or a pictorial message using the second indicator area 224. In the illustrated example, the word "push" (e.g., colored red) is displayed using the second indicator area 224 to indicate to the occupant of the seat that the release button 118 may be pushed to disconnect the belt portion 102 from the buckle portion 104. Other text or pictorial messages could be formed using the second indicator area 224 and displayed in the fourth illumination state.

Figure 6:
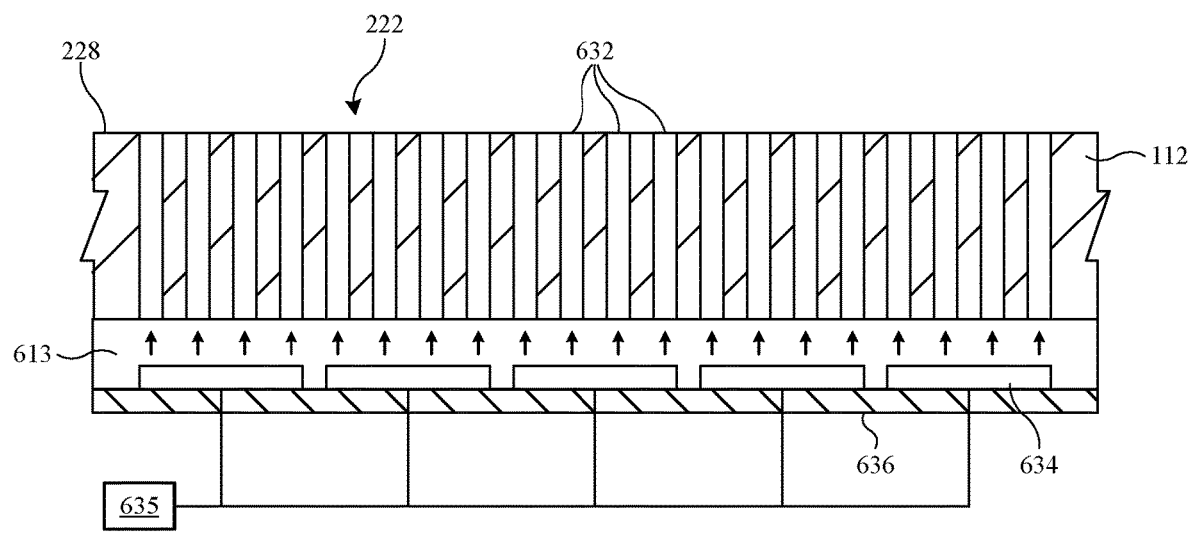
FIG. 6 is a cross-section view illustration showing the first indicator area according to a first implementation.

FIG. 6 is a cross-section view illustration showing the first indicator area 222 according to a first implementation. The first indicator area 222 is defined by holes 632 that extend through the housing surface 228 from the exterior of the buckle housing 112 to an interior space 613 that is defined within the buckle housing 112. In the implementation shown in FIG. 6, the holes 632 are open (e.g., air spaces) and have no solid structures within them.

The holes 632 may be, for example, between approximately thirty micrometers and one-hundred micrometers in diameter and are closely spaced in an array. The holes 632 may each have a consistent diameter through the housing surface from the interior space 613 to the exterior of the buckle housing 112, or the holes 632 may each have a tapered diameter through the housing surface 228 from a larger diameter adjacent to the interior space 613 to a smaller diameter adjacent to the exterior of the buckle housing 112. As an example, in implementations in which the buckle housing 112 is formed from aluminum, the holes 632 may be micro vias that are formed through the buckle housing 112 by laser drilling through the aluminum.

Lighting devices 634 (e.g., one or more lighting devices) are located in the interior space 613 and are oriented such that they are able to emit light toward the holes 632. The lighting devices 634 may be any suitable light-emitting device, such as a white light-emitting diode provided with a color filter, a controllable RGB light-emitting diode, or a video display (e.g., an LCD display screen, an LED display screen, an LCoS display screen, an OLED display screen, etc.) that allows for controllable display of color and/or messages and symbols. The lighting devices 634 are supported with respect to the housing surface 228 by a support structure 636, such as a circuit board or flexible circuit that is supported by and connected to the buckle housing 112 in any conventional manner. In implementations in which the lighting devices 634 are implemented using video displays, the displayed indications, messages, text, symbols, etc. may be controlled using a programmable controller or other computing device to modify the displayed indications, messages, text, symbols, etc.

The lighting devices 634 may be activated (e.g., emitting light) or deactivated (e.g., not emitting light) by a signal received from a controller 635 that is electrically connected to the lighting devices. The controller 635 may be any manner of device (e.g., a circuit or a computing device) that is able to activate and deactivate the lighting devices 634 based on one or more conditions, such as the conditions discussed with respect to the first illumination state, the second illumination state, and the third illumination state.

Figure 7:
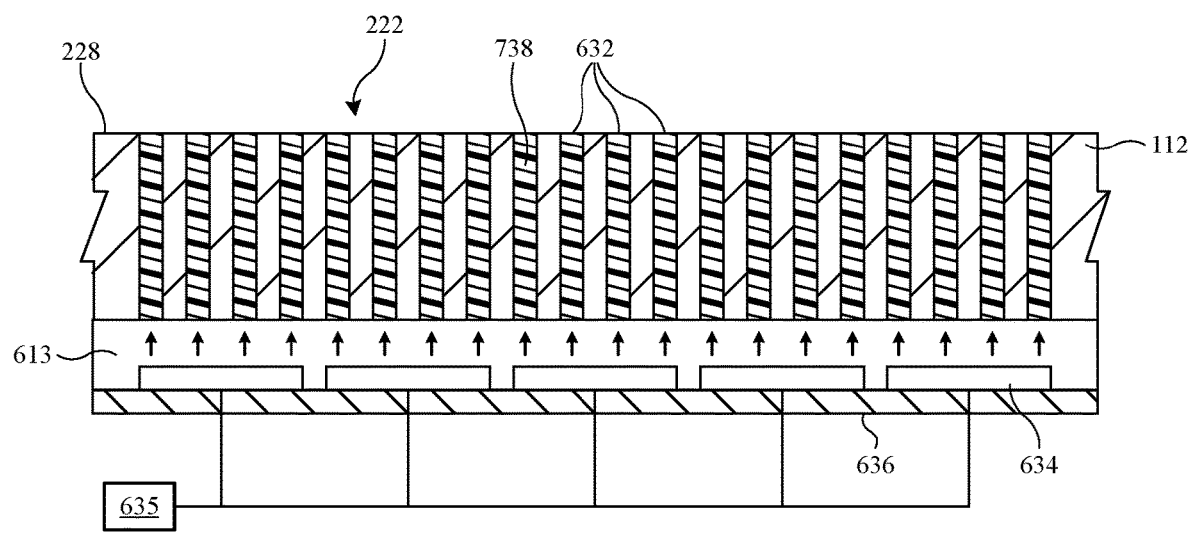
FIG. 7 is a cross-section view illustration showing the first indicator area according to a second implementation.

FIG. 7 is a cross-section view illustration showing the first indicator area 222 according to a second implementation in which the holes 632 are filled with a translucent material 738 (e.g., material allowing transmission of light inclusive of fully transparent materials). As an example, the translucent material 738 may be a translucent plastic resin that is injected into the holes 632 after they are formed (e.g., by laser drilling) and cures into a solid translucent structure that fills the holes 632.

Figure 8:
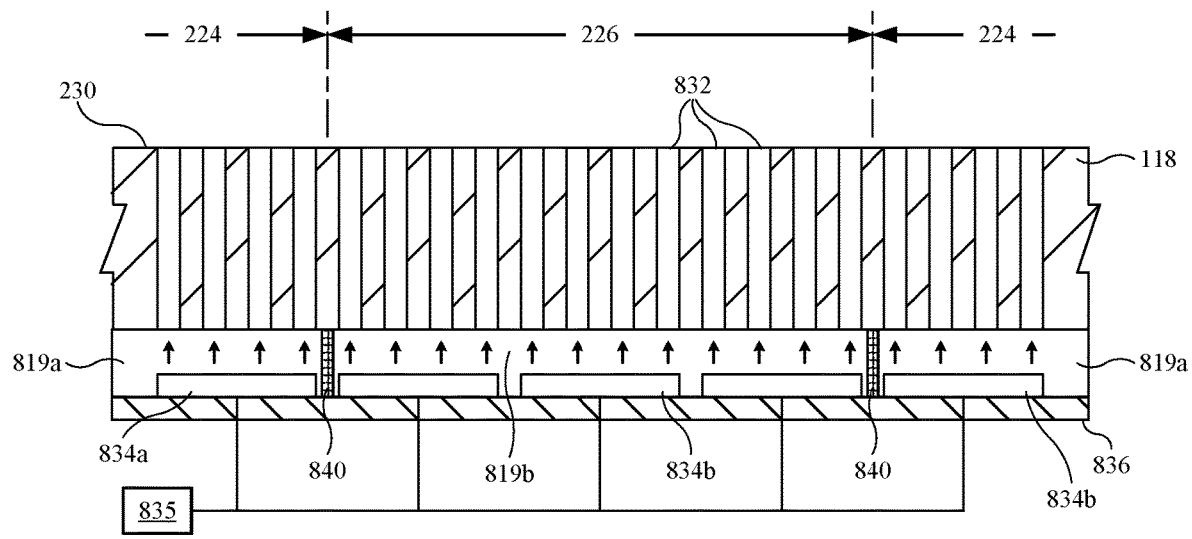
FIG. 8 is a cross-section view illustration showing the second indicator area and the third indicator area according to an implementation.

FIG. 8 is a cross-section view illustration showing the second indicator area 224 and the third indicator area 226 according to an implementation.

The second indicator area 224 and the third indicator area 226 are defined by holes 832 that extend through the button surface 230 from the exterior of the release button 118 to an interior space that is defined within the release button 118.

In the implementation shown in FIG. 8, the interior space that is defined within the release button 118 includes a first interior area 819a that corresponds to the second indicator area 224 and a second interior area 819b that corresponds to the third indicator area 226. Separator structures 840 are located in the interior space of the release button 118 to separate the first interior area 819a and the second interior area 819b to allow separate illumination of the first interior area 819a and the second interior area 819b. The separator structures 840 may be any type of structural element that is able to block light. As one example, the separator structures 840 may be integral portions of the release button 118. As another example, the separator structures 840 may be wall-like structures that depend downward from the inside of the button surface 230 and extend to the support structure 836.

In the implementation shown in FIG. 8, the holes 832 are open (e.g., air spaces) and have no solid structures within them, but the holes 832 may instead be filled with a translucent material, as described with respect to the translucent material 738 of FIG. 7.

The holes 832 may be, for example, between approximately thirty micrometers and one-hundred micrometers in diameter and are closely spaced in an array. The holes 832 may each have a consistent diameter through the housing surface from the interior space 819 to the exterior of the release button 118, or the holes 832 may each have a tapered diameter through the button surface 230 from a larger diameter adjacent to the interior space 819 to a smaller diameter adjacent to the exterior of the release button. As an example, in implementations in which the release button 118 is formed from aluminum, the holes 832 may be micro vias that are formed through the release button 118 by laser drilling through the aluminum.

A first group of lighting devices 834a (e.g., a group of one or more lighting devices) are located in the first interior area and are oriented to emit light toward the holes 832 to selectively illuminate the second indicator area 224. A second group of lighting devices 834b are located in the second interior area 819b and are oriented to emit light toward the holes 832 to selectively illuminate the third indicator area 226. The lighting devices from the first group of lighting devices 834a and the second group of lighting devices 834b may be any suitable light-emitting device, such as a white light-emitting diode provided with a color filter, a controllable RGB light-emitting diode, or a video display (e.g., LED, OLED, etc.) that allows for controllable display of color and/or messages and symbols. The lighting devices from the first group of lighting devices 834a and the second group of lighting devices 834b are supported with respect to the housing surface 228 by a support structure 836, such as a circuit board or flexible circuit that is supported by and connected to the release button 118 in any conventional manner.

The lighting devices from the first group of lighting devices 834a and the second group of lighting devices 834b may be activated (e.g., emitting light) or deactivated (e.g., not emitting light) by a signal received from a controller 835 that is electrically connected to the lighting devices from the first group of lighting devices 834a and the second group of lighting devices 834b. The controller 835 may be any manner of device (e.g., a circuit or a computing device) that is able to activate and deactivate the lighting devices from the first group of lighting devices 834a and the second group of lighting devices 834b based on one or more conditions, such as the conditions discussed with respect to the first illumination state, the second illumination state, and the third illumination state.

Although FIG. 8 shows two indicator areas (the first interior area 819a and the second interior area 819b) that are formed inside the release button 118, the same structural configuration can be used to define any number of indicator areas without limitation. As an example, a large number of relatively small indicator areas could be defined using the structural configuration shown in FIG. 8 to define individually addressable and controllable indicator areas that function equivalent to pixels of a video display. These indicator areas may be controlled using a programmable controller or other computing device to display indications, messages, text, symbols, etc.

Figure 9:
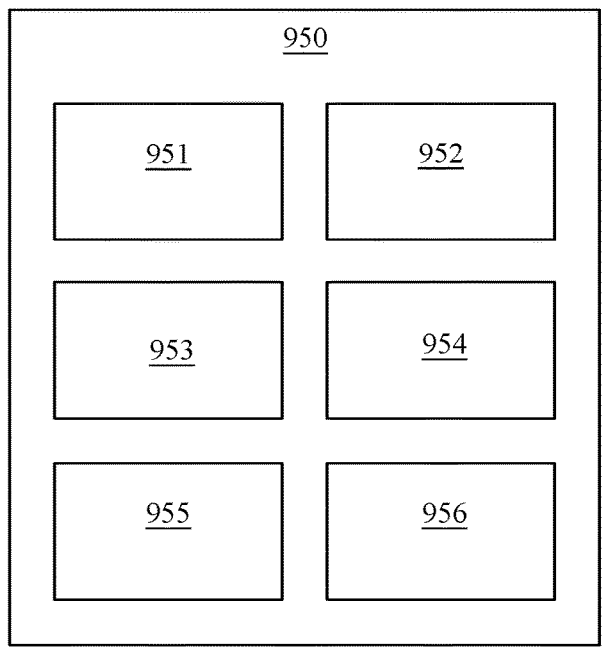
FIG. 9 is a block diagram that shows an example of a vehicle.

FIG. 9 is a block diagram that shows an example of a vehicle 950. The vehicle 950 may include a body 951, a passenger cabin 952, seats 953, safety restraints 954, actuator systems 955, and a controller 956.

The body 951 is a primary structure of the vehicle 950, and may define internal structural components that support other parts of the vehicle 950 (e.g., as in unibody construction) and may also define external aesthetic portions of the vehicle 950. The body 951 may be of conventional design and may include components such as windows and doors. The passenger cabin 952 is defined by the body 951 as an interior space within the body 951. The passenger cabin 952 may be accessed, for example, by doors that open and close.

The seats 953 are located within the passenger cabin 952 and provide seating for occupants of the vehicle 950. The seats 953 are provided with safety restraints 954, which may be implemented per the description of the safety restraint 100.

The actuator system 955 includes components that cause motion of the vehicle 950. The actuator system 955 may include, as examples, suspension actuators, steering actuators, braking actuators, and propulsion actuators. The controller 956 is operable to control operation of various systems of the vehicle 950, including the safety restraints 954 and the actuator system 955. The controller 956 may be a conventional computing device (e.g., having components such as a processor and a memory) that is provided with computer program instructions that allow the controller 956 to generate commands that regulate operation of the various vehicle systems. The controller 956 may operate using signals received from sensors as inputs.

As described above, the present technology may be implemented in a vehicle that carries passengers. Some vehicle systems may implement features that include the gathering and use of data available from various sources to control operation of the vehicle. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to develop a user profile that describes user preferences that can be used to control various aspects of vehicle systems.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the identifying content to be displayed to users, the present technology can be configured to allow users to select to "opt in" or "opt out" of participation in the collection of personal information data during registration for services or anytime thereafter. In another example, users can select not to provide personal data. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, customized vehicle system control can be performed using non-personal information data or a bare minimum amount of personal information, other non-personal information available to the devices, or publicly available information.

What is claimed is:

1. A safety device for a vehicle, comprising:
   an opaque surface;
   a first indicator area that includes first openings that extend through the opaque surface and a first lighting device that is located in a first interior space behind the opaque surface; and
   a second indicator area that includes second openings that extend through the opaque surface and a second lighting device that is located in a second interior space behind the opaque surface,
   wherein the first openings are less than one-hundred micrometers in diameter to cause the opaque surface to appear uninterrupted in the first indicator area when the first lighting device is not illuminated and the second openings are sized such that the opaque surface appears to be uninterrupted in the second indicator area when the second lighting device is not illuminated.

2. The safety device of claim 1, further comprising:
   a third indicator area that is surrounded by the second indicator area and that includes third openings that extend through the opaque surface and a third lighting device that is located in a third interior space behind the opaque surface, wherein the third openings are sized such that the opaque surface appears to be uninterrupted in the third indicator area when the third lighting device is not illuminated.

3. The safety device of claim 2, wherein the first openings are arranged in a first array on the first surface of the housing, the second openings are arranged in a second array on the first surface of the housing, and the third openings are arranged in a third array on the first surface of the housing.

4. The safety device of claim 2, wherein the first openings, the second openings, and the third openings have a consistent diameter.

5. The safety device of claim 2, wherein the first openings, the second openings, and the third openings have a tapered diameter.

6. The safety device of claim 2, wherein a translucent material fills each of the first openings, the second openings, and the third openings.

7. The safety device of claim 2, wherein the first indicator area is illuminated separate from the second indicator area and the third indicator area.

8. A safety device for a vehicle, comprising:
   a housing including a slot;
   an insertable portion configured to fit within the slot;
   a first indicator area that is located on the housing, the first indicator area including an opaque surface of the housing, first perforations formed through the opaque surface of the housing, and a first lighting device that is located in an interior space of the housing that is behind the opaque surface; and
   a second indicator area that is located on the housing surrounding the slot, second perforations formed through the opaque surface of the housing such that the second perforations surround the slot, and a second lighting device that is located in the interior space of the housing that is behind the opaque surface;
   wherein each of the first and second lighting devices may be activated and deactivated to define a first illumination state in which one or both of the first and second indicator areas are illuminated by the first and second lighting devices, respectively, and a second illumination state in which one or both of the first and second indicator areas are not illuminated by the first and second lighting devices, respectively.

9. The safety device of claim 8, wherein the first perforations are arranged in a first array through the opaque surface and the second perforations are arranged in a second array through the opaque surface.

10. The safety device of claim 8, wherein the first perforations are arranged to form a textual message when the first indicator area is illuminated by the first lighting device.

11. The safety device of claim 8, wherein a translucent material fills each of the first and second perforations.

12. The safety device of claim 8, wherein the first and second lighting devices include light-emitting diodes.

13. The safety device of claim 8, wherein the first and second lighting devices include a video display.

14. The safety device of claim 8, further comprising a controller for controlling activation and deactivation of the first and second lighting devices.

15. The safety device of claim 8, wherein the first and second perforations are sized such that the opaque surface appears to be uninterrupted in the first and second indicator areas, respectively.

16. The safety device of claim 8, wherein the first and second perforations are less than one-hundred micrometers in diameter.

17. A vehicle, comprising:
   a body;
   a safety device coupled to the body, the safety device including:
       a housing having an opaque surface;
       an indicator area defined by holes formed through the opaque surface of the housing; and
       a lighting device that is located in an interior space of the housing that is behind the indicator area,
   wherein the indicator area is selectively illuminated to indicate an operating state of the safety device and the holes are sized such that the opaque surface appears to be uninterrupted in the indicator area when the lighting device is not illuminated,
   wherein the safety device is a safety restraint, the housing is a buckle portion of the safety restraint, the safety restraint further includes a tongue plate, the housing further includes a slot configured to receive the tongue plate, and the indicator area extends around the slot to indicate the location of the slot through selective illumination of the indicator area.

18. The vehicle of claim 17, wherein the operating state of the safety device includes an installed state, a disconnected state, and a vehicle-in-motion state.

19. The vehicle of claim 17, wherein the indicator area forms a closed shape around the slot.

20. The vehicle of claim 17, wherein a translucent material is located in the holes.

21. The vehicle of claim 17, wherein the holes are less than one-hundred micrometers in diameter.

* * * * *